United States Patent
Baid et al.

(10) Patent No.: US 11,055,264 B2
(45) Date of Patent: Jul. 6, 2021

(54) AUTOMATICALLY COORDINATING APPLICATION SCHEMA CHANGES IN A DISTRIBUTED DATA STORAGE SYSTEM

(71) Applicant: Dropbox, Inc., San Francisco, CA (US)

(72) Inventors: Mehant Baid, San Mateo, CA (US); Mihnea C. Giurgea, San Francisco, CA (US); Bogdan Munteanu, San Mateo, CA (US)

(73) Assignee: Dropbox, Inc., San Francisco, CA (US)

( * ) Notice: Subject to any disclaimer, the term of this patent is extended or adjusted under 35 U.S.C. 154(b) by 364 days.

(21) Appl. No.: 15/591,635

(22) Filed: May 10, 2017

(65) Prior Publication Data

US 2018/0329931 A1 Nov. 15, 2018

(51) Int. Cl.
| | |
|---|---|
| *G06F 16/30* | (2019.01) |
| *G06F 16/21* | (2019.01) |
| *G06F 9/54* | (2006.01) |
| *G06F 8/71* | (2018.01) |
| *G06F 16/23* | (2019.01) |
| *G06F 9/455* | (2018.01) |
| *G06F 8/60* | (2018.01) |

(52) U.S. Cl.
CPC .............. *G06F 16/213* (2019.01); *G06F 8/60* (2013.01); *G06F 8/71* (2013.01); *G06F 9/45541* (2013.01); *G06F 9/547* (2013.01); *G06F 16/219* (2019.01); *G06F 16/2379* (2019.01)

(58) Field of Classification Search
CPC .. G06F 16/213; G06F 16/219; G06F 16/2379; G06F 8/60; G06F 8/71; G06F 9/45541; G06F 9/547
See application file for complete search history.

(56) References Cited

U.S. PATENT DOCUMENTS

| | | | |
|---|---|---|---|
| 7,890,543 B2* | 2/2011 | Hunt ..................... | G06F 9/4492 707/803 |
| 2003/0212660 A1* | 11/2003 | Kerwin ................. | G06F 16/252 |
| 2010/0145962 A1* | 6/2010 | Chen ................. | G06F 16/24558 707/758 |
| 2012/0023080 A1* | 1/2012 | Bolohan ............... | G06F 16/219 707/705 |
| 2013/0066832 A1* | 3/2013 | Sheehan ................ | G06Q 10/00 707/634 |

(Continued)

OTHER PUBLICATIONS

Article entitled "Online, Asynchronous Schema Change in F1", by Rae et al., dated Aug. 30, 2013 (Year: 2013).*

*Primary Examiner* — Mahesh H Dwivedi

(74) *Attorney, Agent, or Firm* — Hickman Becker Bingham Ledesma LLP; Adam C. Stone

(57) ABSTRACT

Computer-implemented techniques for automatically coordinating application schema changes in a distributed data storage system. The techniques improve the operation of a computing system by automating the deployment of application schemas changes to a distributed data storage system in a manner that does not introduce orphaned data inconsistencies or integrity inconsistencies to the application data stored in the distributed data storage system. The techniques include a schema change deployment protocol that ensures that all of the database servers of the distributed data storage system are using no more than two consecutive versions of the application schema at any given time.

13 Claims, 8 Drawing Sheets

(56) References Cited

U.S. PATENT DOCUMENTS

2013/0318129 A1* 11/2013 Vingralek ............. G06F 16/211
                                                707/803
2016/0132542 A1*  5/2016 Li ....................... G06F 16/9574
                                                707/696
2017/0323203 A1* 11/2017 Matusov ............... G06F 17/289

* cited by examiner

AUTOMATICALLY COORDINATING APPLICATION SCHEMA CHANGES IN A DISTRIBUTED DATA STORAGE SYSTEM

TECHNICAL FIELD

The present invention relates to distributed data storage systems. More particularly, the present invention relates to automatically coordinating application schema changes in a distributed data storage system.

BACKGROUND

Today, many online services, including many Internet services used by users around the globe, are implemented as complex, large-scale distributed computing systems. These online services are often constructed from collections of software applications developed by different software development teams, often in different software programming languages. The collection of software applications may span hundreds or thousands of computing machines, across multiple data center facilities.

Because of this complexity, the architecture of an online service is typically structured in "tiers" with each tier composed of many computing machines. The tiers are conceptually stacked on top of one another from the perspective of processing requests received over a network from end-user devices and generating responses to the requests that are sent back over the network to the end-user devices. One of the tiers is typically composed of a large-scale distributed data storage system for persisting and retrieving data used by applications in an "application tier." The application tier conceptually sits on top of the data storage system tier and may implement much of the end-user facing functionality of the online service.

The "application" data used by the applications may include, for example, information provided by end-users, metadata about such information or any other information used by the applications as a part of providing the online service to end-users. Further, the application data may be structured and indexed in the distributed data storage system per a schema that defines, for example, the various types of data objects in the application data, the member attributes, field, or properties of the data objects, and the secondary indexes on the application data in the distributed data storage system.

DETAILED DESCRIPTION

Figure 1:
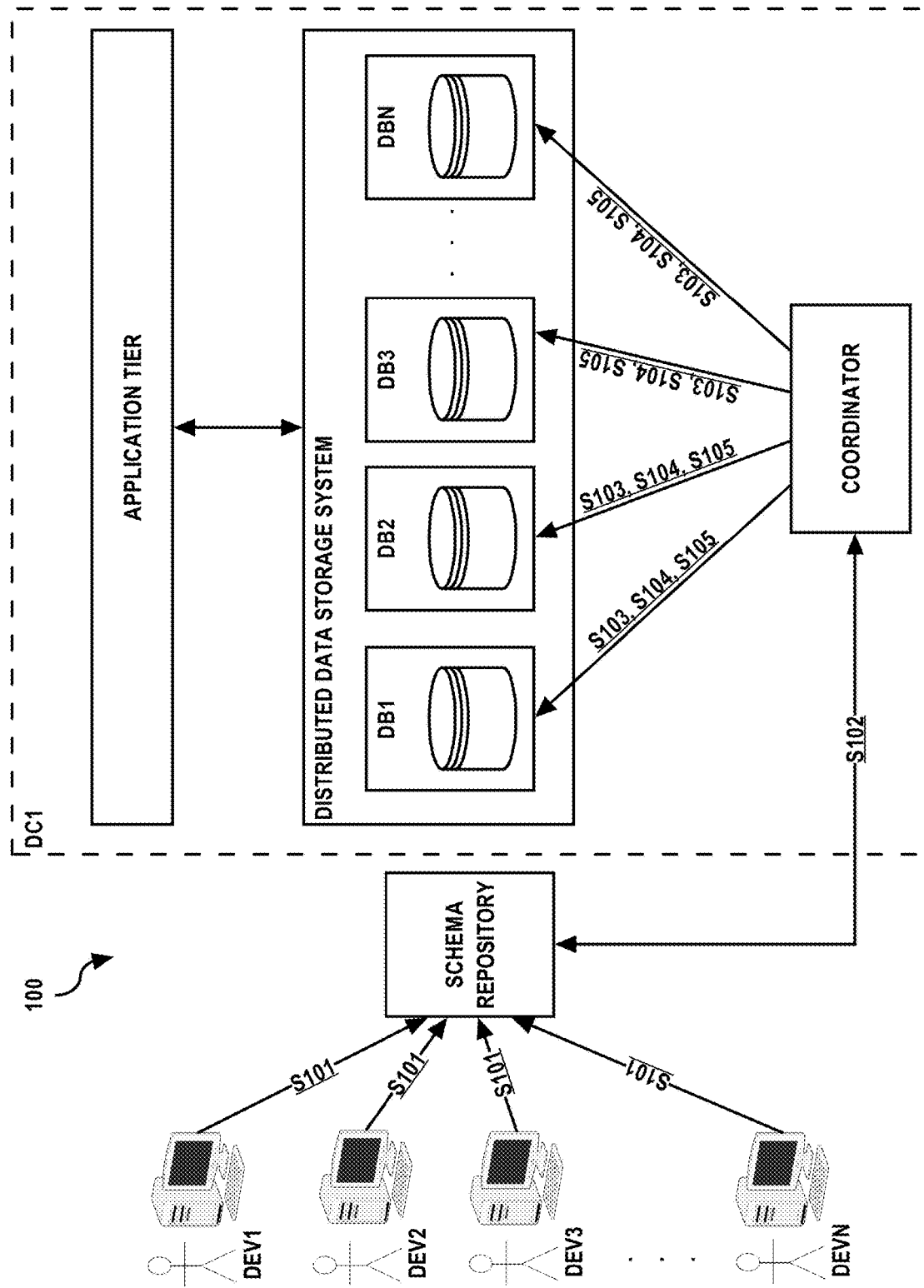
FIG. 1 shows an automatic schema change coordination system.

The development of a large-scale online service is a never-ending process. New end-user features are constantly being added, old or deprecated features removed, and existing features continuously optimized. As such, it is typically not practical to assume a fixed, never changing schema for application data. As part of the never-ending development process, the developers of applications may desire to make frequent schema changes (e.g., multiple schema changes per day or per week). A schema change may include adding or removing a schema element such as, for example, adding or removing a secondary index, a data object type, or a field, attribute, or property of a data object type.

A challenge to the development of large-scale online services is to allow application developers to make frequent schema changes while avoiding introducing data inconsistencies to the application data stored in a distributed data storage system. Such data inconsistencies may include orphaned data inconsistencies and integrity inconsistencies. An orphaned data inconsistency exists if there is data stored in the data storage system that should not exist per the schema. An integrity inconsistency exists if there is data that is missing from the data storage system that should exist per the schema. For example, a data inconsistency exists if a secondary index entry for application data exists in a secondary index but the indexed application data is not stored in the data storage system. As another example, a data inconsistency exists if application data stored in the data storage system should be indexed in a secondary index but the secondary index does not contain an index entry for the application data.

One possible approach to making schema changes is to designate a human administrator that is responsible for collecting schema changes from the application developers, verifying and organizing the schema changes, and applying the schema changes to the data storage system during a regularly scheduled maintenance window (e.g., once or twice a week in the early morning hours of the day in the time zone where the data center is located). However, a more automated approach for deploying schema changes may be preferred.

To address the foregoing problem and other problems with existing approaches for coordinating schema changes in a distributed data storage system, techniques described, suggested, and implied herein include systems and methods for automatically coordinating changes to an application schema in a distributed data storage system. The techniques may be used in place of or in conjunction with the existing approaches.

The techniques include a method performed by a computing system comprising one or more processors and memory. The method includes the step of receiving from each database server of a plurality of known database servers in a distributed data storage system, an identifier of a version of an application schema currently in use at the database server. The method further includes the step of determining, based at least in part on the identifiers received from the database servers, that each of the database servers is currently using the same version of the application schema. The method further includes sending a next version of the application schema to each of the database servers based on determining that all the database servers are currently on the same version of the application schema. By doing so, the method improves the computing system for deploying application schema changes at least by automating the deployment of the application schema changes to the distributed data storage system. The method further improves the computing system for this purpose by ensuring that no more than two consecutive versions of the application schema are in use in the distributed data storage system always. By ensuring this, reasoning about the consistency of the application data in the distributed data system during schema changes is simplified.

Other techniques described in greater detail below involve automatically transitioning added schema elements and removed schema elements through intermediate states during schema changes. This automatic transitioning improves the operation of the computing system by preventing the introduction of orphaned data inconsistencies and integrity inconsistencies by the schema changes.

Glossary

The following definitions are offered for purposes of illustration, not limitation, to assist with understanding the discussion herein:

For purposes of this application, the term "application data" refers to data used by an application and stored in a distributed data storage system including any secondary indexes built on the data in the distributed data storage system.

For purposes of this application, the term "application schema," as used herein, refers generally to a set of schema element definitions that enable machine interpretation of application data stored in the storage system.

For purposes of this application, the term "global application schema," as used herein, refers to an application schema as defined above that enables machine interpretation of application data stored in the storage system used by multiple applications where at least some of the multiple applications may share usage of at least some the application data. All global application schemas as just defined are necessarily application schemas as just defined but not all application schemas as just defined are global application schemas as just defined.

For purposes of this application, the term "schema element," as used herein, refers to an element defined by an application schema such as, for example, a type of data object, a member attribute, field, or property of a data object type, or a secondary index.

For purposes of this application, the term "secondary index," as used herein, refers to an index of data objects in a distributed data storage system built on one or more attributes of the data objects where at least one of the one or more attributes on which the secondary index is built is not a primary key attribute of the data objects. For example, for a set of data objects representing users of an online service each having a globally unique identifier (GUID) attribute, a name attribute, and an e-mail address attribute where the GUID attribute is the primary key attribute, then a secondary index could be built on the data objects representing the users on any of: (a) the name attribute, (b) the e-mail address attribute, (c) both the name attribute and the e-mail address attribute, (d) the GUID attribute and the name attribute, (e) the GUID attribute and the e-mail address, or (f) the GUID attribute, the name attribute, and the e-mail address attribute.

Automatic Schema Change Coordination System

A system 100 is configured for automatically coordinating changes to an application schema in a distributed data storage system. The system 100 can be used with any suitable distributed data storage system, such as the exemplary distributed data storage system described herein. For example, the system 100 may be operated by a large-scale online service provider that provides content management and content collaboration applications to end-users.

The system 100 functions to automatically deploy application developer schema changes to the distributed data storage system without requiring the distributed data storage system, or a portion thereof, to be taken offline and without introducing orphaned data inconsistencies or integrity inconsistencies to the application data stored in the distributed data storage system. As an example, the system 100 can function to automatically deploy a schema change that adds a secondary index on the application data. The system 100 may be configured for automatically deploying schema changes to a distributed data storage system of a large-scale Internet service having thousands or millions of users or more, but may alternatively be configured for a smaller-scale distributed data storage systems such as those may be used in an enterprise, educational, or government context.

In operation, the system 100 guarantees that all database servers of the distributed data storage system are using the same version of the application schema or a version that is at most one version behind the same version. During operation, if a next version of the application schema is ready to be deployed but not all the database servers are currently using the current version of the application schema, then the system 100 does not deploy the next version of the application schema to any of the database servers until all the database servers are using the current version. Thus, all requests to perform operations on application data received by the distributed data storage system from the application tier will be served per at most two consecutive versions of the application schema. As illustrated in greater detail below, the two consecutive versions only restriction simplifies reasoning about the operation of the system 100 with respect to schema updates and transitions between schema versions in the distributed data storage system and prevents the introduction of data inconsistencies in the application data stored in the distributed data storage system because of deploying a schema change.

As shown in FIG. 1, the system 100 includes a schema deployment coordinator computing system (referred to hereinafter as just the "Coordinator"). The Coordinator may be communicatively coupled to a schema repository computing system (referred to hereinafter as just the "Schema Repository"). The Coordinator may be further communicatively coupled to each of a plurality of database server computing systems (DB1, DB2, DB3, DBN) of a distributed data storage system (referred to hereinafter as the "Storage System"). The Storage System may be communicatively coupled to an application tier computing system (referred to hereinafter as the "Application Tier"). The Application Tier, the Storage System, and the Coordinator may be co-located in a data center or other computer hosting facility (labeled "DC1").

The Schema Repository, the Coordinator, the Storage System, and the Application Tier may be implemented, at least in part, by one or more processors and memory. Various computer programs (e.g., one or more sets of computer-executable instructions) may be stored in the memory (e.g., one or more non-transitory computer-readable media) and configured for execution by the processor(s). The various computer programs may include instructions configured to perform various operations described herein related to automatically coordinating schema changes in a distributed data storage system. When the computing system is a distributed computing system, the processor(s) and memory may be communicatively coupled to one another via one or more data communications networks such as, for example, one or more Internet Protocol (IP)-based networks.

The system 100 depicts in FIG. 1 is an example of one possible arrangement of the various system components. Other arrangements are possible and the present invention is not limited to any arrangement. For example, the Schema Repository may also be co-located with the Coordinator in data center DC1. Alternatively, the Coordinator may be co-located with the Schema Repository in the same building or facility that houses the application developers and their workstations.

An example benefit of the system 100 is that automated distributed asynchronous schema changes are enabled. With the system 100, application developers can make schema changes and the system 100 will automatically deploy the changes to the Storage System in an automated and coordinated manner and without introducing data inconsistencies in the application data stored in the Storage System. In contrast with conventional, less automated approaches, the application developers do not need to wait for a human administrator to deploy the schema changes at a next scheduled maintenance window.

Schema Repository

One or more application developers (DEV1, DEV2, DEV3, DEVN) use their respective workstation computers to periodically edit and check-in (S101) changes to schema source files to the Schema Repository using a version control system such as a source code control system, revision control system, or other suitable version control system for tracking changes to source code files or text files. While an entire application schema may be represented as a single file, it is also possible to distribute the schema representation over multiple files if desired. The contents of the file may be encoded in a structured data serialization format such as, for example, protocol buffers, YAML, JSON, or the like. The file representing the schema may be generated periodically or on demand from the schema sources files because of schema compilation process that generates the file representing the schema given the schema source files as input.

When an application developer desires to modify the application schema, the developer updates one or more schema source files in the version control system to include the desired modification. The Schema Repository can batch several independent application developer modifications together in a single schema change.

Schema Version Identifiers

Each schema change may correspond to a new version of the application schema and may be assigned a schema version identifier. A version of the application schema may incorporate multiple developer updates to the schema source files. The schema version identifiers assigned to schema changes may be used to order schema versions by their assigned identifiers. For example, numerical schema version identifiers can be assigned to new schema versions based on a monotonically increasing counter. The counter may be reset to a starting counter value (e.g., zero) before or when a maximum counter value is reached. However, there is no requirement that two consecutive schema version identifiers per the counter be numerically consecutive. For example, a counter that assigns schema version identifiers based on a current time since an epoch at a time of the assignment with resolution to the second will not assign numerically consecutive identifiers to two consecutive schema versions assigned identifiers more than one second apart. The Coordinator may maintain the monotonically increasing counter and may assign schema version identifiers to new schema versions based on the counter. However, the counter can be centralized elsewhere (e.g., at the Schema Repository).

When a next version of the application schema is ready at the Schema Repository, the Schema Repository can push (S102) the next version to the Coordinator for deployment. Alternatively, the Coordinator can pull (S102) the next version from the Schema Repository. It will be appreciated that various techniques for pushing or pulling information between computers over a network may be employed for purposes of distributing the next version of the application schema from the Schema Repository to the Coordinator. For example, the Coordinator may maintain a long polling connection over a data network to the Schema Repository by which the Schema Repository can notify the Coordinator when the next version of the application schema is ready to be downloaded from the Schema Repository. The Coordinator can assign a schema version identifier to the next version of the application schema that the Coordinator obtains (via push or pull) from the Schema Repository.

The Schema Repository may maintain a schema change journal comprising a series of schema change files. When an application developer checks in or commits changes to one or more schema source files to the version control system, the Schema Repository may generate a schema file representing the entire application schema including the latest changes to the schema source files. The schema file may then be provided to the Coordinator via a push or pull mechanism. The contents of the schema file may be encoded in a structured data serialization format such as, for example, protocol buffers, YAML, JSON, or the like.

As described in greater detail herein, the Coordinator may automatically generate and deploy consecutive "intermediate" schema versions of the application schema to the Storage System to avoid introducing data inconsistencies to the application data stored in the Storage System. In contrast to an intermediate schema version, a version of the application schema that is generated from the schema sources in the version control system is referred to hereinafter as a "source" schema version. Unless otherwise apparent in context, reference to a schema or a schema version herein without the "intermediate" or "source" qualifier refers generally to both (a) an intermediate schema or intermediate schema version and (b) a source schema or source schema version. As described in greater detail herein, the Coordinator may automatically generate and deploy consecutive intermediate schema versions to the Storage System to transition the application data stored in the Storage System between two consecutive source schema versions in a way that does not introduce data inconsistencies to the application data.

As a brief example that is elaborated on more fully herein, consider a new source schema version that adds a secondary index that is not present in the current schema version $S_1$ deployed to the Storage System. To prevent data inconsistencies, after the current schema version $S_1$ has been deployed to all the database servers of the Storage System, the Coordinator may generate and deploy intermediate schema version $S_2$ to all the database servers. The intermediate schema version $S_2$ may be generated based on the new source schema version. In intermediate schema version $S_2$, the index may be set to a "delete-only" state. Then, after the intermediate schema version $S_2$ has been deployed to all the database servers, the Coordinator may generate and deploy intermediate schema version $S_3$ to all of the database servers. The intermediate schema version $S_3$ may also be generated based on the new source schema version. In intermediate schema version $S_3$, the index may be set to a "write-only" state. Then, after the intermediate schema version $S_3$ has been deployed to all the database servers, the Coordinator may backfill the index in the Storage System. Then, after the Coordinator has completed the backfill process with all database servers, the Coordinator may generate and deploy the new source schema version to all the database servers. In the new source schema version, the index is not restricted to delete-only or write-only like in the intermediate schema versions. The reason for the "delete-only" state and the "write-only" state for the index and the backfill process are explained in greater detail below. In general, however, the reasons for these states and the intermediate schemas and for performing the backfill process is to maintain the application data stored in the Storage System in a consistent state, as described in greater detail below.

Coordinator

The Coordinator may determine what version of the application schema to deploy to the database servers. The Coordinator may further determine when to deploy the target version of the application schema to the database servers. After the Coordinator has determined the target version to deploy and the time to deploy the target version has come, the Coordinator may then deploy the target version to the database servers. For this, Coordinator may use a "membership" list of all the database servers that make up the Storage System. The membership list may be stored in a memory (e.g., non-transitory computer-readable media) as a list data structure or other suitable data structure. The Coordinator may use the membership list to determine which database servers to contact as part of coordinating schema changes in the Storage System. For example, the membership list may contain the hostnames or network address of the database servers in the Storage System. The membership list may be maintained manually. For example, an administrator may update the membership list as database servers are added to or removed from the Storage System. Alternatively, the membership list may be maintained automatically per a service discovery protocol that Coordinator participates in. As yet another alternative, the Coordinator may automatically populate the membership list based on information obtained from a service registration database such as, for example, one based on APACHE ZOOKEEPER, or the like.

Determining the Target Version

To determine the target version of the application schema to deploy, the Coordinator may send (S103) a "GetLatestSchema" remote procedure call (RPC) message to each of the database servers of the Storage System. The GetLatestSchema RPC message sent to each of the database servers may ask the database server for the schema version identifier of the version of the application schema that the database server is currently using to serve requests from the Application Tier. Serving a request per a schema may include, but is not limited to, the database server: (a) verifying that application data to be written to the Storage System conforms to the current schema version in use at the database server, (b) adding an index entry to a secondary index in the Storage System for application data written to the Storage System, and (c) removing an index entry from a secondary index in the Storage System for application data deleted from the Storage System.

In response to receiving the GetLatestSchema RPC message, the database server may return a reply RPC message to the Coordinator specifying the schema version identifier currently in use at the database server. If a database server is non-responsive, the Coordinator may periodically resend the GetLatestSchema RPC message the database server until a responsive reply is received from the database server.

The Coordinator may not deploy the next version of the application schema to any of the database servers until all the database servers are currently using the current version of the application schema. This is done so that no more than two consecutive versions of the application schema are in use by the Storage System any given time.

If all the database servers reply to the GetLatestSchema RPC message and all are currently using the version of the application schema prior to the next version of the application schema (i.e., all the database servers using the current version), then Coordinator may determine that the version of the application schema to deploy is the next version of the application schema. On the other hand, if some of the database servers are using the current version of the application schema and the remaining database servers are still using the version of the application schema prior the current version, then the Coordinator may determine that the version of the application schema to deploy is the current version to the remaining database servers that are still currently using the prior version of the application schema. This situation may occur, for example, if an error or failure occurred during a prior attempt by the Coordinator to deploy the current version of the application schema to all database servers.

If all database servers reply to the GetLatestSchema RPC message and three or more different versions of the application schema are currently in use among the database servers, then the Coordinator may determine that an unexpected error has occurred which must be resolved before the next version of the application schema is deployed to any of the database servers.

The following, using line number labels, is an example of a Protocol Buffer definition of a GetLatestSchema RPC message that may be sent from the Coordinator to a database server:

```
0001: message GetLatestSchema {
0002:   optional bool get_data = 1;
0003: }
```

Per the above-definition, the Coordinator may set the optional "get_data" Boolean value to the value "1" to have the database server return a copy of the application schema currently in use at the database server.

The Coordinator may be implemented as a stateless service with respect to the target application schema version such that if the Coordinator fails, crashes, or is restarted after deploying the target application schema version to some but not all of the database servers, then, upon restart, the Coordinator can send the GetLatestSchema message with the "get_data" value set to "1" to obtain a copy of the target application schema version from one of the database servers to which the target application schema version was deployed before the crash, failure, or restart. The Coordinator can then continue to deploy the obtained copy to the remaining database servers to which the target application schema version has not yet been deployed without having to obtain the target application schema version from the Schema Repository.

The following, using line number labels, is an example of a Protocol Buffer definition of a reply RPC message from a database server to the Coordinator in response to receiving a GetLatestSchema RPC message from the Coordinator:

```
0001: message GetLatestSchemaReply {
0002:    optional uint32 version_id = 1;
0003:    optional bytes global_schema = 2;
0004: }
```

Per the above-definition, the reply message from a database server may return the schema version identifier of the application schema currently in use at the database server as a thirty-two 32-bit value of the "version_id" attribute. The reply message may also provide a copy of the current version in use at the database server as a byte sequence value of the "global_schema" attribute.

The above RPC message definitions and other PRC message definitions provided herein are provided merely as examples of possible message definitions for an RPC protocol. It will be appreciated that other RPC message formats may be used to accomplish the functions of the example RPC message definitions provided herein including RPC message formats using other data serialization formats such as, for example, XML-RPC, JSON, YAML, or the like.

Deploying the Schema

After the Coordinator determines the target version of the application schema to deploy (i.e., either the next version or the current version), the Coordinator may deploy the target version to the database servers. To do this, Coordinator may send (S105) an "InsertSchema" RPC message to a database server. The InsertSchema RPC message may contain the target version of the application schema and the schema version identifier assigned to the target version. The target version of the application schema may be sent in the InsertSchema RPC message in a compressed data format compressed per a standard data compression algorithm (e.g., ZIP).

If the target version of the application schema is the next version, then all the database servers are currently on the current version of the application schema and the InsertSchema RPC message may be sent to each and every of the database servers in the Storage System. If the target version of the application schema is the current version, then some of the database servers are currently on the prior version of the application schema and the InsertSchema RPC message may be sent to just those database servers. However, even in the case that the target version of the application schema is the current version, the InsertSchema RPC message may still be sent to all the database servers and those database servers already currently using the current version can simply ignore the InsertSchema RPC message. If a database server is non-responsive, the Coordinator may periodically resend the InsertSchema RPC message to the database server until a responsive reply is received from the database server.

The following, using line number labels, is an example of a Protocol Buffer definition of an InsertSchema RPC message that may be sent from the Coordinator to a database server:

```
0001: message InsertSchema {
0002:    optional uint32 version_id = 1;
0003:    optional bytes schema_blob = 2;
0004: }
```

Per the above-definition, the value of the "version_id" attribute specifies the schema identifier of the target version of the application schema. The "schema_blob" contains the target version of the application schema itself, in a byte-encoded, and possibly, compressed, format.

The following, using line number labels, in an example of a Protocol Buffer definition of a reply message to an InsertSchema message that may be sent back to the Coordinator from a database server:

```
0001: message InsertSchemaReply {
0002:    optional SchemaError.Error error = 1;
0003: }
```

Per the above-definition, the database server may set the value of the "error" attribute to "1" if the database server encountered an error deploying the target version of the application schema. Even if the target version of the application schema is successfully deployed to a database server as indicated in the reply message, the target version may not be in use at the database server for serving requests from the Application Tier immediately after it is successfully deployed in accordance with a schema refresh interval and a stale schema threshold time discussed in greater detail below.

Schema Refresh Interval

There may be a time after which the Coordinator deploys a new version of the application schema to a database server that the database server is expected to have begun using the new version to serve requests from the Application Tier. The time lag between when Coordinator deploys a new version of the application schema to a database server and when the database server begins using the new version to serve requests from the Application Tier may depend on a schema refresh interval, or how often the database server checks for new schema versions deployed to it by the Coordinator.

The schema refresh interval may range variously per the requirements of the implementation at hand. In one example implementation, the schema refresh interval is one (1) second. The schema refresh interval determines how often the database server checks for a new schema version deployed to the database server by the Coordinator.

Stale Schema Threshold

There may also be a time, after a database server has begun using a new version of the application schema, during which the database server will continue using the existing version of the application schema to serve pending requests from the Application Tier. The length of this period is referred to herein as the "stale schema threshold" and may range variously per the requirements of the implementation at hand. In one example implementation, the stale schema threshold is 300 seconds. A pending request is a request that the database server is already processing when the database server begins using the new version of the application schema. New requests from the Application Tier received by the database server after the database server has begun using the new version of the application schema may be served by the database server per the new version of the application schema.

Because of the schema refresh interval and stale schema threshold time periods, the Coordinator may not deploy the target version of the application schema to any of the database servers until at least an amount of time equal to the sum of the schema refresh interval and the stale schema threshold has passed since the current version of the application schema was deployed to each database server. This is done to prevent more than two consecutive versions of the application schema from being used by the database servers at the same time.

After (1) the Coordinator determines that all the database servers are currently using the current version of the application schema and before (2) the Coordinator deploys the target version of the application schema to any of the database servers, the Coordinator may verify that none of the database servers are still serving requests from the Application Tier per the prior version of the application schema. To do this, Coordinator may send (S104) a "StaleSchema" RPC message to each of the database servers. The StaleSchema RPC message may ask each database server to determine whether the time since the current version of the application schema was deployed to the database server is greater than the sum of the schema refresh interval and stale schema threshold. A database server may reply to the StaleSchema RPC message with a value (e.g., a Boolean value) indicating whether this temporal conditional is satisfied or not.

The Coordinator may not deploy (S105) the target version of the application schema to any of the database servers until all the database servers have replied to the StaleSchema RPC message indicating that they are no longer serving requests from the Application Tier per the version of the schema prior to the current version. If a database server is non-responsive, the Coordinator may periodically resend the StaleSchema RPC message to the database server until a responsive reply is received from the database server.

Coordinator Failures

The Coordinator can fail, unexpectedly crash, or otherwise enter an error state when deploying the target version of the application schema to all database servers. If this occurs, the target version may not have been deployed to all the database servers before the failure occurred. In this case, after recovering and restarting from the failure, the Coordinator can restart the deployment process from the beginning including determining the target version to deploy by issuing GetLatestSchema RPC messages to all the database servers. In this case, the Coordinator may determine that the target version to deploy is the former target version that was determined before the failure occurred. The Coordinator can then proceed to deploy the target version of the application schema to the database servers that are still on the current version.

Partitioning Between Coordinator and the Database Servers

It is also possible for one or more of the database servers to fail during a deployment of the target schema version. In this case, like in the Coordinator failure case, the target version may not have been deployed to all the database servers before the failure. In this case, after recovering and restarting from the failure, the Coordinator can restart the deployment process from the beginning including determining the target version to deploy by issuing GetLatestSchema RPC messages to all the database servers like in the Coordinator failure case. If one or more of the database servers are still in a failure state and do not reply to the RPC message, Coordinator will not proceed with deploying a target version until all the database servers are reachable and reply with to the RPC message.

Beneficially, because Coordinator will attempt to determine the target version to deploy after failure of the Coordinator or a database server by issuing the GetLatestSchema RPC message to all the database servers, the Coordinator does not need to store (persist) or maintain state information across failures tracking which database servers the target version of the application schema has already been successfully deployed to.

Edge-Based Application Schema

The application data stored in the Storage System may be structured per an edge-based application schema. Conceptually, application data structured per the edge-based application schema may be laid out in a graph comprising nodes and directed edges. Each node in the graph represents an "Entity" and each directed edge in the graph from a "source" node to a "remote" data is an "Association" between the "Source Entity" represented by the source node and the "Remote Entity" represented by the remote node. Application data can be stored on both Entities (nodes) and Associations (directed edges) as attributes defined in the application schema. Entities and Associations can be of different types and all Entities (nodes) and Associations (directed edges) of the same type share the same schema definition. Two Entities (nodes) may have only one Association of a given type between them.

Figure 2:
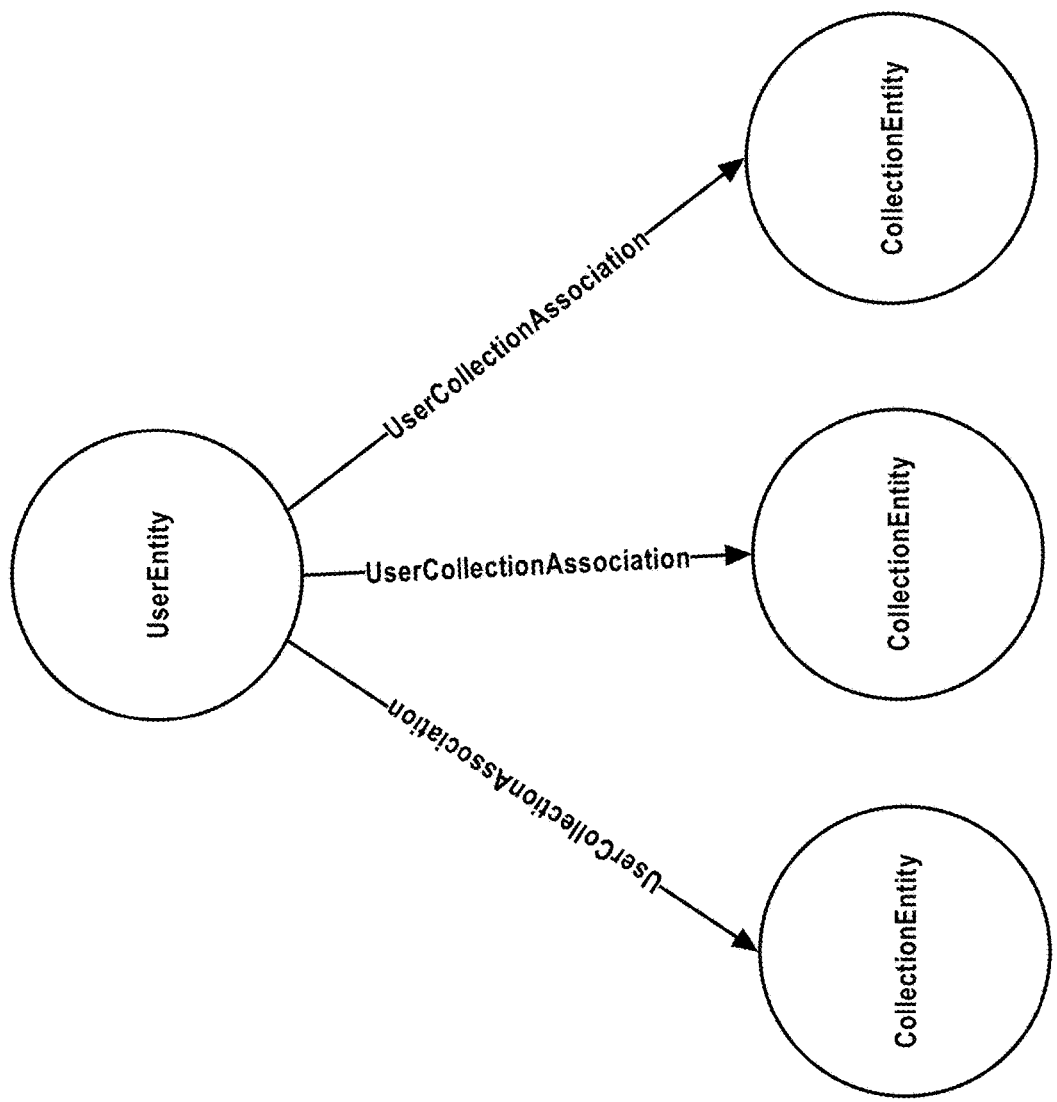
FIG. 2 shows application data structured per an edge-based application schema.

FIG. 2 shows example application data structured per an edge-based application schema. In this example, a "UserEntity" can be associated with multiple of a "CollectionEntity," each through a "UserCollectionAssocation". Every Entity stored in the Storage System may be uniquely identified by a globally unique identifier, or GUID. The globally unique identifier may be a one-hundred and twenty-eight (128) bit value that is composed of a sixty-four (64) bit database shard identifier and a sixty-four (64) bit identifier uniquely identifying the Entity within the shard, for example. The Storage System may use the shard identifier to route requests from the Application Tier to a database server that stores the shard.

The application schema is object-oriented with encapsulation and inheritance properties and may define sub-classes of a base "Entity" class and a base "Association" class. An Entity sub-class defined in the application schema may describe a schema for all Entities (instances) in the application data that are instances of that sub-class. An Entity (instance) may have at least one attribute the value is which is the Entity's GUID. Similarly, an Association sub-class defined in the application schema may describe a schema for all Associations (instances) in the application data that are instances of that sub-class. An Association (instance) may have at least two GUID attributes: a "Source GUID" identifying the Source Entity of the Association, and a "Remote GUID" identifying the Remote Entity attribute of the Association. An Association in the application data may be uniquely identified by the combination of its Association sub-class, its Source GUID, and its Remote GUID.

As an example, consider application data that represents a universe of users and applications where applications have a set of users, and users have installed a set of applications that they use. In this case, the application schema may define the following Entity and Association sub-classes:

(a) "UserEntity" as a sub-class of the base Entity class;
(b) "ApplicationEntity" as a sub-class of the base Entity class;
(c) "UserApplicationAssociation" as a sub-class of the base Association class;
(d) "ApplicationUserAssociation" as a sub-class of the base Association class.

With this example schema, a user may be represented in the application data as an instance of the UserEntity subclass and an application may be represented as an instance of the ApplicationEntity sub-class. An application that a user has installed may be represented as an instance of the UserApplicationAssociation sub-class where the UserEntity instance representing the user is the Source Entity and the ApplicationEntity instance representing the application is the RemoteEntity. A user of an application may be represented as an instance of the ApplicationUserAssociation sub-class where the ApplicationEntity instance representing the application is the Source Entity and the UserEntity instance representing the user is the Remote Entity.

The application schema can define attributes of an Entity sub-class or an Association sub-class. As will be apparent to those skilled in the art, an attribute may instead be referred to in other contexts as a member, a member variable, a property, or a field. Each attribute of an Entity sub-class or an Association sub-class may be defined in the application schema as one of the following basic data types:
(a) Boolean (e.g., a binary value or other value have only two possible values)
(b) Integer (e.g., a 64-bit signed integer)
(c) Float (e.g., a 64-bit floating point number)
(d) String (e.g., a Unicode string)
(e) List (e.g., a list data structure)
(f) Dictionary (e.g., a dictionary or associative array data structure)
(g) GUID (e.g., a 128-bit globally unique identifier)

As an example, with line number labels, the base Entity class may be defined in a source file of the application schema as follows, per an object-oriented programming language (e.g., Python):
0001: class Entity:
0002: guid=Attr.GUID(required=True)

In the above example definition of the Entity base class, one GUID-type attribute is named "guid". As such, each Entity instance in application data, including all instances of an Entity sub-class by inheritance, are required to have the "guid" Attribute.

As an example, the ApplicationEntity sub-class may be defined in a source file of the application schema as follows, per an object-oriented programming language:
0001: class ApplicationEntity(Entity):
0002: name=Attr.String(required=True)
0003: verified=Attr.Bool(default=False)
0004: type=Attr.String(required=True)
0005: creator_user_gid=Attr.GID(ref='UserEntity')

In the above example, the ApplicationEntity sub-class defines four Attributes in addition to the "guid" attribute defined by the Entity base class. The "name" attribute is of type String and is required in all instances of an ApplicationEntity in the application data. The optional "verified" attribute is of type Boolean with a default value of "False". The "type" attribute is of type String and is required in all instances of an ApplicationEntity. The optional "creator_user_gid" attribute is of type GID. In an instance of an ApplicationEntity, the creator_user_gid attribute may refer to UserEntity instance by the GUID of that UserEntity instance.

As an example, the base Association class may be defined in a source file of the application schema as follows:
0001: class Association:
0002: source_guid=Attr.GUID(required=True)
0003: remote_guid=Attr.GUID(required=True)

In the above example definition of the Association base class, two Attributes are required in every instance of an Association. The two attributes identify the Source Entity and Remote Entity of the Association instance.

As another example, the ApplicationEntity sub-class may be defined in a source file of the application schema as follows:

0001: class ApplicationUserAssocation(Association):
0002: app_type=Attr. String( )
0003: install_time=Attr.Int(required=True)

In the above example of the definition of the ApplicatioNUserAssociation sub-class, two attributes are defined in addition to the source_guid and "remote_guid Attributes inherited from the definition of the Association base type. The "app_type" attribute is of type String and the required "install_time" Attribute is of type Integer.

Secondary Index Example

An application schema may define secondary indexes on the application data. Secondary indexes may be defined as part of the definition of an Association sub-class. As an example, the following definition of a "DeveloperApplicationAssociation" sub-class of the Association base class defines three secondary indexes:
0001: class DeveloperApplicationAssociation(Association):
0002: last_updated=Attr.Int( )
0003: app_title=Attr. String( )
0004: app_version=Attr.String( )
0005: app_language=Attr. String( )
0006: app_rating=Attr.String( )
0007:
0008: _index_=[(source_guid, app_title, app_version),
0009: (source_guid, app_language),
0010: (source_guid, app_rating)]

In the above example, each secondary index is defined as an element of the "_index_" list-type attribute. Each element of the list is a tuple of attributes defining the secondary index. A secondary index allows efficient filtering by any leftmost prefix of the attributes in the tuple. For example, the secondary index tuple (source_guid, app_title, app_version) would correspond to a secondary index in the Storage System that would provide indexed querying capabilities on: (a) the source_guid attribute, (b) the source_guid attribute and the app_title attribute, and (c) the source_guid attribute, the app_title, and app_version attributes of all instances in the application data of an DeveloperApplicationAssociation. For example, the secondary index corresponding to the tuple (source_guid, app_language) may be useful for efficiently identifying all English language applications by a given developer.

Database Representation

The application data may be stored in Storage System in rows of relational database tables where the tables are sharded (partitioned) over the database servers of the Storage System. Each of the database servers may store multiple shards (partitions). For example, Storage System may contain over two thousand (2,000) shards distributed across over two hundred and fifty (250) database servers.

Each shard of the Storage System may be served by one master database server instance with an additional two slave database server instances for backup or failover. Thus, each database server of the Storage System may contain up to three database server instances, a master database server instance, and two slave database server instances. Each of the master and two slave database server instance may include a database server management program for executing queries against the underlying sharded database. Each of the master and the two slave database server instances of a database server may be an instance of a relational database management system (RDBMS) such as, for example, an instance of the MYSQL RDBMS, or the like.

Representation of Entities and Associations

Figure 3:
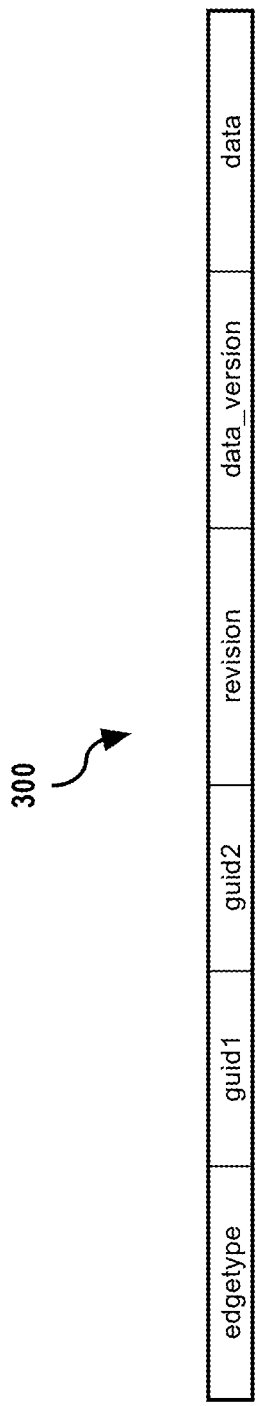
FIG. 3 shows a relational database table row representation for storing an entity or an association of an edge-based application schema.

Each Entity instance and each Association instance of the application data may be stored in a row of a "data" table of the sharded relational database. FIG. 3 shows a row representation 300 for the data table. As shown, each row of the data table includes the following named columns:
(a) "edgetype" (e.g., storing a value 16 bytes in length)
(b) "guid1" (e.g., 16 bytes)
(c) "guid2" (e.g., 16 bytes)
(d) "revision" (e.g., 8 bytes)
(e) "data_version" (e.g., 2 bytes)
(f) "data" (e.g., variable size)

The value of the "edgetype" column of the row may store a representation of the sub-class of the Entity or Association that the corresponding Entity or Association is an instance of. The value of the "guid1" column of the row may store a representation of the GUID of the Entity, if the row corresponds to an Entity. Alternatively, if the row corresponds to an Association, the value of the "guid1" column of the row may store a representation of the Source GUID of the Association. If the row corresponds to an Entity, the value of the "guid2" column of the row may store a duplicate representation of the GUID of the Entity. This allows the same database operations to be performed on the data table for both Entities and Associations. Alternatively, two data tables could be used. One for storing Entities and another for storing Associations. In this case, the table for storing Entities may omit the "guid2" column.

Returning to the representation 300 of FIG. 3, if the row corresponds to an Association instead of an Entity, the value of the "guid2" column of the row may store a representation of the Remote GUID of the Association. The "version" column of the row may store a representation of the current revision (version) of the Entity or Association. The "data" column of the row may store a serialized and encoded representation of the Entity or Association. The serialized and encoded representation of the Entity or Association may omit representations of the sub-class of the Entity or Association, the GUID or Source GUID of the Entity or Association, and the GUID or Remote GUID of the Entity or Associations, which are already stored in the "edgetype", "guid1", and "guid2" columns of the row, respectively. The "data_version" column of the row stores a representation of the type of encoding used in the "data" column.

Representation of Secondary Indexes

Figure 4:
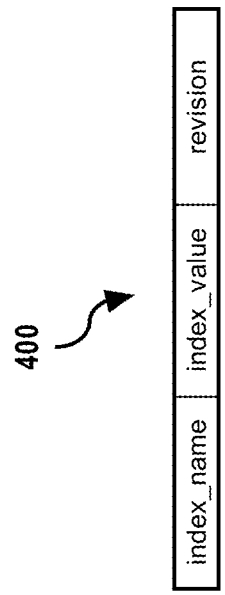
FIG. 4 shows a relational database table row representation for storing a secondary index entry.

Each index entry of the application data may be stored in a row of an "index" table. FIG. 4 shows a row representation 400 for the index table. As shown, each row of the index table includes the following named columns:
(a) "index_name" (16 bytes)
(b) "index_value" (variable size)
(c) "revision" (16 bytes)

Each row of the index table represents an index entry. The "index_name" column of the row may store an identifier of the index definition tuple specified in the application schema. The "index_value" column of the row may be encoded in such a way to allow exact and range queries using the Structured Query Language (SQL). The "revision" column of the row stores the current revision for the corresponding entry in the data table.

Representation of Application Schema Versions

Application schema versions deployed to the Storage System may be stored in the Storage System. Each shard of the Storage System may store a copy of the application schema. Each shard of each of the database servers may contain a "schema" table that stores application schema versions deployed to the Storage System by the Coordinator. This makes the application schema highly-available and does not require the Storage System to be configured with a specially designated shard or a specially designated database server for storing the application schema.

Figure 5:
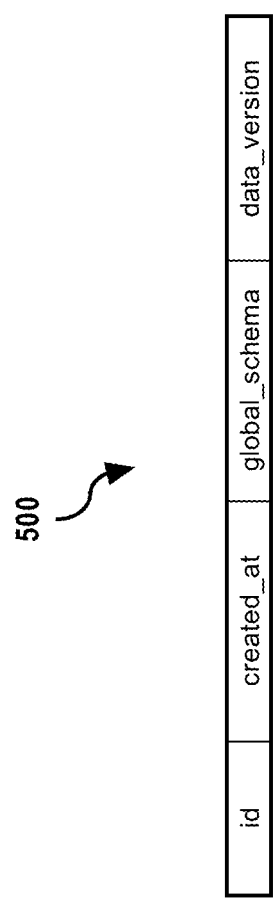
FIG. 5 shows a relational database table row representation for storing an application schema version.

FIG. 5 shows a relational database table row representation 500 for storing an application schema version deployed by the Coordinator. Each row of the schema table may correspond to a different version of the application schema. As shown, the row representation 500 contains an "id" column, a "created_at" column, a "global_schema" column, and a "data_version" column. The "id" column of the row stores the schema version identifier assigned to the corresponding application schema version. The "created_at" column of the row stores a time when the row was inserted (added) to the schema table. The "global_schema" column of the row stores the schema version itself, in a byte-encoded, and possibly compressed, data format. The "data_version" column of the row stores the encoding version of the schema encoded in the "global_schema" column of the row.

Each of the database servers of the Storage System may periodically check the schema table for a newly deployed version of the application schema. A check for a new schema version may be made by each database server at the schema refresh interval. The check may be performed by issuing a query against the schema table. The query can be for all rows of the schema table with a value in the "id" column greater than the schema version identifier of the application schema currently in use at the database server. Note that this query should return at most one row since the Coordinator ensures that at most two consecutive versions of the application schema are in use among all the database servers of the Storage System at any given time. If more than one row is returned from the query, then the database server may determine that an error occurred. As an alternative, if it will be assumed this error will not occur, the query can ask for at most the one row to be returned using a SQL LIMIT operator or the like.

While serving requests from the Application Tier per a version of the application schema, the database server may store the schema version identifier of the version in memory (e.g., a non-transitory computer-readable media). The database server may retrieve the schema version identifier from a memory location when periodically checking for a newly deployed schema version against the schema table. If the event that the database server fails and restarts, the database server may query the schema table for the application schema version associated with the highest schema version identifier as stored in the "id" column of the schema table. This schema version may then be used to server requests from the Application Tier.

The above-described example edge-based application schema and database representation is provided merely as an example of a possible application schema and database representation thereof that may be used in the present invention. Other application schemas and other database representations may also be used. For example, a database representation of an edge-based application schema may have separate data tables for storing Entities and Associations instead of a single data table that stores both.

Data Consistency

The Coordinator may automatically ensure that data inconsistencies are not introduced to the application data stored in the Storage System when new schema versions are deployed. The Coordinator ensures that orphaned data inconsistencies and integrity inconsistencies are not introduced. The Coordinator does this by transitioning new schema elements and removed schema elements through two intermediate states.

All schema elements of an application schema version currently in use at a database server may be in one of the following states:

Absent—The schema element that is not present (not defined) in the application schema version and the database server will not allow any operations on instance(s) of the schema element in the application data stored in Storage System. A schema element may be in the Absent state if it is marked as such in the application schema version. For example, a schema element marked in an application schema version as absent or deprecated may be in the Absent state. Marking a schema element in an application schema version can be accomplished on a variety of different ways and the present invention is not limited to any way or manner of marking a schema element. For example, the definition of a schema element in the application schema version may be associated with a machine-readable tag or other machine-readable metadata that "marks" the schema element as Absent or another one of the schema element states.

Public—The schema element is present (defined) in the application schema version and the database server may allow all operations (read, delete, update) on instance(s) of the schema element.

Delete-Only—The database server will allow only delete operations on instance(s) of the schema element. An update operation may be composed of a delete operation followed by an insert operation. If a schema element is in the Delete-Only state, the database server may allow the delete operation of an update operation on an instance of the schema element but not allow the insert operation. In the delete-only state, read operations also will not be allowed.

Write-Only—The database server may allow delete and insert operations on instance(s) of the schema element. The database server will not allow read operations on instance(s) of the schema element.

Adding and Removing Schema Elements

The Absent and Public states are considered "final" states that may be intended by a source application schema. The Delete-Only and Write-Only states are considered "intermediate" states that the Coordinator will automatically transition a schema element through on its way to one of the final states.

When a new source schema version adds a schema element such as a secondary index that was not present in the prior deployed version of the application schema, the Coordinator transitions the schema element from the Absent State to the Delete-Only state by deploying a first intermediate schema version to all the database servers where the schema element is marked as Delete-Only in the first intermediate schema version. After this, the Coordinator transitions the schema element from the Delete-Only state to the Write-Only state by deploying a second intermediate schema version to all the database servers where the schema element is marked as Write-Only in the second intermediate schema version. After this, the Coordinator may backfill the schema element in the application data stored in the Storage System. Finally, the Coordinator transitions the schema element from the Write-Only state to the Public state by deploying a third schema version where the new schema element is not marked as Delete-Only or Write-Only in the third schema version.

When a new source schema version removes a schema element that was present in the prior deployed version of the application schema, the Coordinator transitions the schema element essentially in reverse of the transition for adding a schema element. The Coordinator first deploys a first intermediate schema version to all the database servers where the schema element is marked as Write-Only in the intermediate schema version. After this, the Coordinator deploys a second intermediate schema version to all the database servers where the schema element is marked as Delete-Only in the second schema version. After this, the Coordinator deletes instance(s) of the schema element from the application data stored in The Storage System. Finally, the Coordinator deploys a third schema version to all the database servers where the schema element is absent from the third schema version.

Adding a New Secondary Index Example

For the application data including any secondary indexes on the application data stored in the Storage System to remain in a consistent state during schema changes, the following invariants should always hold true:

Invariant 1—No secondary index entries may exist in the Storage System without a corresponding secondary index definition in the application schema version currently in use. For example, no rows of the index table described above should exist in the index table if there is not a corresponding secondary index definition tuple in the application schema version currently in use.

Invariant 2—Once a secondary index is in the Public state, the secondary index should be complete. That is, all data objects in the application data that should be indexed in the secondary index are in fact indexed in the secondary index and all entries in the secondary index have corresponding data objects in the application data. For example, all rows in the data table described above that should be indexed per the current application schema version have a corresponding row in the index table and all rows in the index table should have corresponding rows in the data table.

Invariant 3—Every entry in the secondary index must have a corresponding data object in the application data. For example, every row in the index table should have a corresponding row in the data table.

Figure 6:
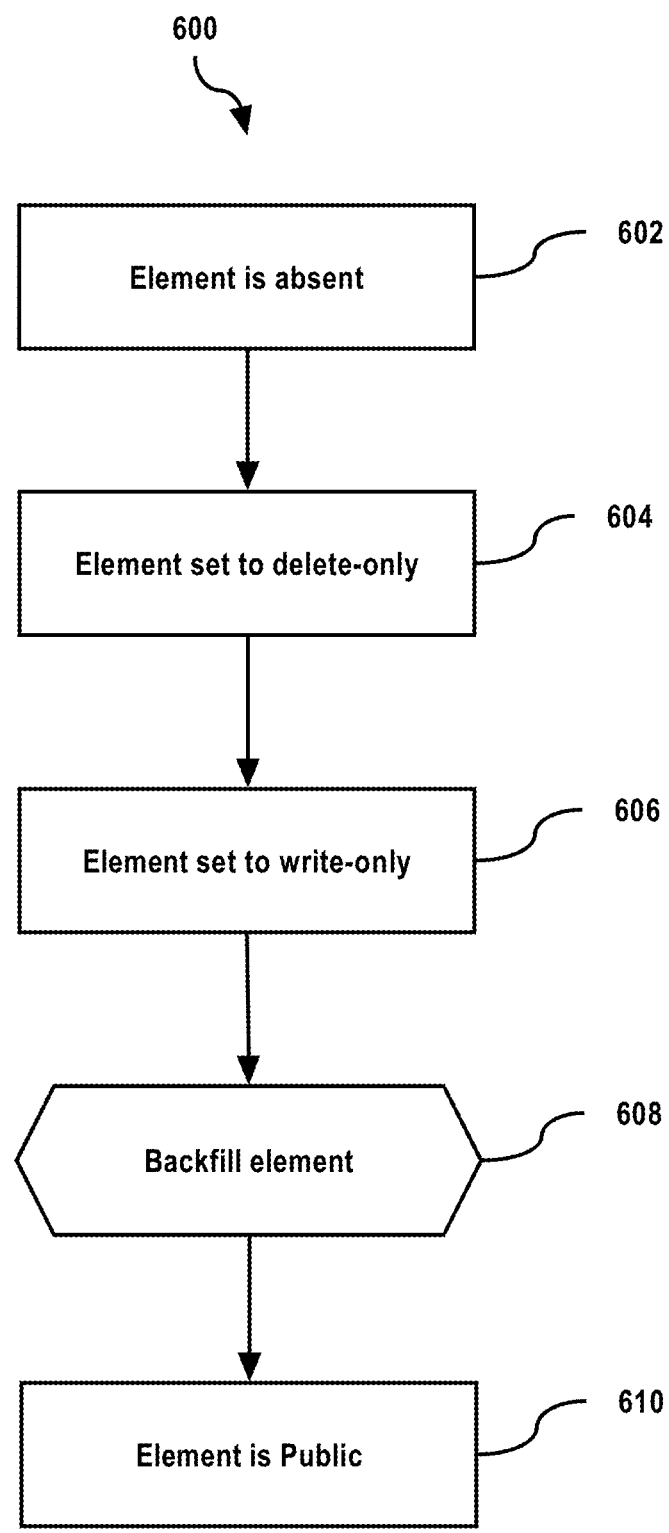
FIG. 6 shows state transitions of an added schema element in a distributed data storage system during application schema changes.

An example of schema transitions that the Coordinator may automatically perform when a new version of a source application schema adds a new secondary index will now be described with respect to the Drawings. FIG. 6 shows the state transitions 600 of an added schema element in the Storage System during application schema changes.

Initially, all the database servers are on application schema version $S_1$ where the secondary index is absent (602). Since the secondary index is absent, only Invariant 1 above applies. Invariant 1 holds true in this case since there cannot by any entries in the secondary index since the secondary index is absent from schema version $S_1$.

Next, the Coordinator begins deploying schema version $S_2$ where the secondary index is marked as delete-only (604). In this case, for a time, some of the database servers are still on schema version $S_1$ (where the secondary index is absent) and some of the database servers are schema version $S_2$ (where the secondary index is in the Delete-Only state). With respect to Invariant 1, since all the database servers are on schema version $S_1$ where no index operations are allowed on the secondary index or on schema version $S_2$ where only delete operations are allowed on the secondary index, no new index entries can be added to the secondary index. Thus, Invariant 1 holds true in this case. Invariant 2 does not apply because the secondary index is not in the Public state. With respect to Invariant 3, since no new index entries can be inserted (added) to the secondary index while the secondary index is in the Delete-Only state, there cannot be entries in the secondary index that don't have corresponding data objects in the application data stored in the Storage System.

Next, after the Coordinator has deployed schema version $S_2$ to all the database servers, the Coordinator begins deploying schema version $S_3$ where the secondary index is marked as write-only (606). In this case, for a time while schema version $S_3$ is being deployed to all the database servers, some of the database servers are still on schema version $S_2$ (where the secondary index is marked as delete-only) and some of the database servers are on schema version $S_3$ (where in the secondary index is marked as write-only). With respect to Invariant 1, since all the database servers are on schema version $S_2$ or schema version $S_3$, the secondary index will be defined by the application schema. So, Invariant 1 holds true. Invariant 2 does not apply since the secondary index is not yet in the Public state in either schema version $S_2$ or schema version $S_3$. With respect to Invariant 3, each database server is either on schema version $S_2$ where index entries of the secondary index can be deleted or on schema version $S_3$ where index entries of the secondary index can be added (inserted) or deleted. So long as the database servers delete index entries from the secondary index when corresponding data objects are deleted from the application data, Invariant 3 will hold true.

For example, consider the situation where a database server DB1 using schema version $S_3$ (write-only) receives a request from the Application Tier to add a new data object that should be indexed by the secondary index per schema version $S_3$. In this case, database server DB1 will add an index entry for the new data object to the secondary index when adding the new data object to the application data. Now a database server DB2 still using schema version $S_2$ (delete-only) may receive a request to update the data object. Recall, that an update operation may be a combination of a delete operation and an insert operation. As such, the data object and the corresponding index entry will be deleted from the Storage System but a new data object or a new corresponding index entry will not be inserted to the Storage System, thereby upholding Invariant 3.

After the Coordinator has deployed schema version $S_3$ to all of the database servers, the Coordinator may initiate a backfill process (608) to backfill the secondary index with index entries. The Coordinator may determine data objects in the application data that should be indexed in the secondary index but do not currently have corresponding index entries in the secondary index. Note that once the secondary index is in the Write-only state (606), inserting a data object to the application data that should be indexed by the secondary index can result in a corresponding index entry to be added to the secondary index. And deleting a data object can result in the corresponding index entry being removed from the secondary index. Thus, the set of data objects to backfill at a given database server will include only data objects that existed at the database server prior to the secondary index being placed in the Write-only state at the database server. Backfilling the secondary index at a database server may include adding a corresponding index entry to the secondary index for each such data object that should be indexed in the secondary index. The Coordinator may backfill the secondary index this way at each of the database servers.

After the Coordinator deploys schema version $S_3$ to all of the database servers and backfilled the secondary index at all of the database servers, the Coordinator may begin deploying schema version $S_4$ where the secondary index is in the Public state (610). While deploying schema version $S_4$ to all the database servers, some of the database servers may still be using schema versions $S_3$ and some of the database servers may be using schema version $S_4$. In this situation, with respect to Invariant 1, it holds true since all the database servers have the secondary index defined in the schema version ($S_3$ or $S_4$) being used by the database server. With respect to Invariant 2, a database server using either schema version $S_3$ or schema version $S_4$ can add and remove index entries in the secondary index as corresponding data objects are added and removed in the application data, thereby keeping the secondary index in a consistent state. Since Invariant 2 holds true, so does Invariant 3. Once all the database servers are using schema version $S_4$, the three invariants hold true for the same reasons.

It should be noted why the Delete-only state may be necessary when adding a secondary index to the application schema. Consider a situation where it is allowed for a secondary index to be in the Absent state at one database server DB1 and at the same time in the Write-only state at another database server DB2. A request from the Application Tier to insert a new data object that is routed to database server DB2 will result in the new data object being added to the application data stored at database server DB2 and result in an index entry for the new data object to be added to the secondary index at database server DB2. However, if a request to delete the data object is routed to database server DB1, then database server DB1 will only delete the data object and will not also delete the corresponding index entry because the secondary index is in the Absent state at database server DB1. Thus, the Delete-only state is used to prevent this orphaned data inconsistency.

Removing a Secondary Index Example

Figure 7:
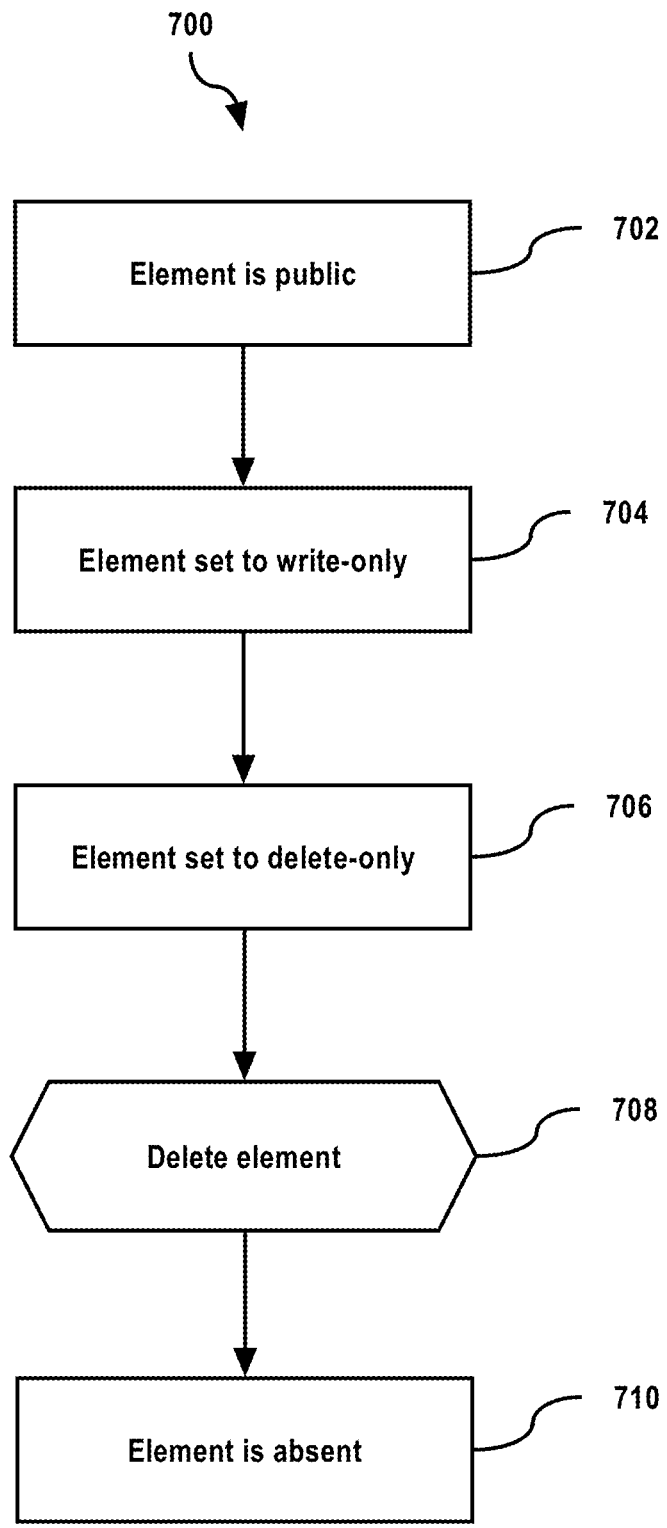
FIG. 7 shows state transitions of a removed schema element in a distributed data storage system during application schema changes.

For removing a schema element, the state transitions are essentially reversed. As an example, FIG. 7 shows the state transitions 700 of a removed secondary index in the Storage System during application schema changes.

Initially, all the database servers on schema version $S_1$ in which the secondary index is in the Public state (702).

The Coordinator can then receive a new source schema version in which the secondary index is marked to be removed. In this case, the Coordinator may deploy a first intermediate schema version $S_2$ to all the database servers in which the secondary index is marked as write-only (704). Invariant 1 holds true in this case since all the database servers have a definition of the secondary index in their application schema versions (either $S_1$ or $S_2$). Both Invariant 2 and Invariant 3 are upheld because only read requests are rejected at database servers on schema version $S_2$ and update and delete requests, including keeping the secondary index consistent with the update and delete requests, are allowed on database servers on either schema version $S_1$ or $S_2$.

After intermediate schema version $S_2$ has been deployed to all the database servers, the Coordinator may deploy intermediate schema version $S_3$ to all the database servers in which the secondary index is marked as delete-only (706). Invariant 1 still holds true because all the database servers have a definition of the secondary index in this application schema versions regardless if they are using schema version $S_2$ or $S_3$. Invariant 2 does not all apply because the secondary index is not public under either schema version $S_2$ or $S_3$. Regarding Invariant 3, database servers using schema version $S_2$ where the secondary index is marked as write-only continue to keep the secondary index consistent with respect to insert, update, and delete operations and continue to not allow read operations on the secondary index. Database servers using schema version $S_3$ where the secondary index is marked as delete-only allow delete operations on the secondary index including where an indexed data object is updated or deleted. Recall that an update operation is a delete operation followed by an insert operation. Thus, when the secondary index is marked as delete-only at a database server, a database server receiving a request to update an indexed data object will delete the data object and delete the corresponding index entry in the secondary index but will not insert a new data object or a new index entry.

After intermediate schema version $S_3$ has been deployed to all the database servers, the Coordinator may delete (708) the secondary index at each of the database servers.

After the secondary index has been deleted at each of the database servers, the Coordinator may deploy schema version $S_4$ to all of the database servers in which the secondary index is absent (710).

Basic Implementing Mechanisms

Figure 8:
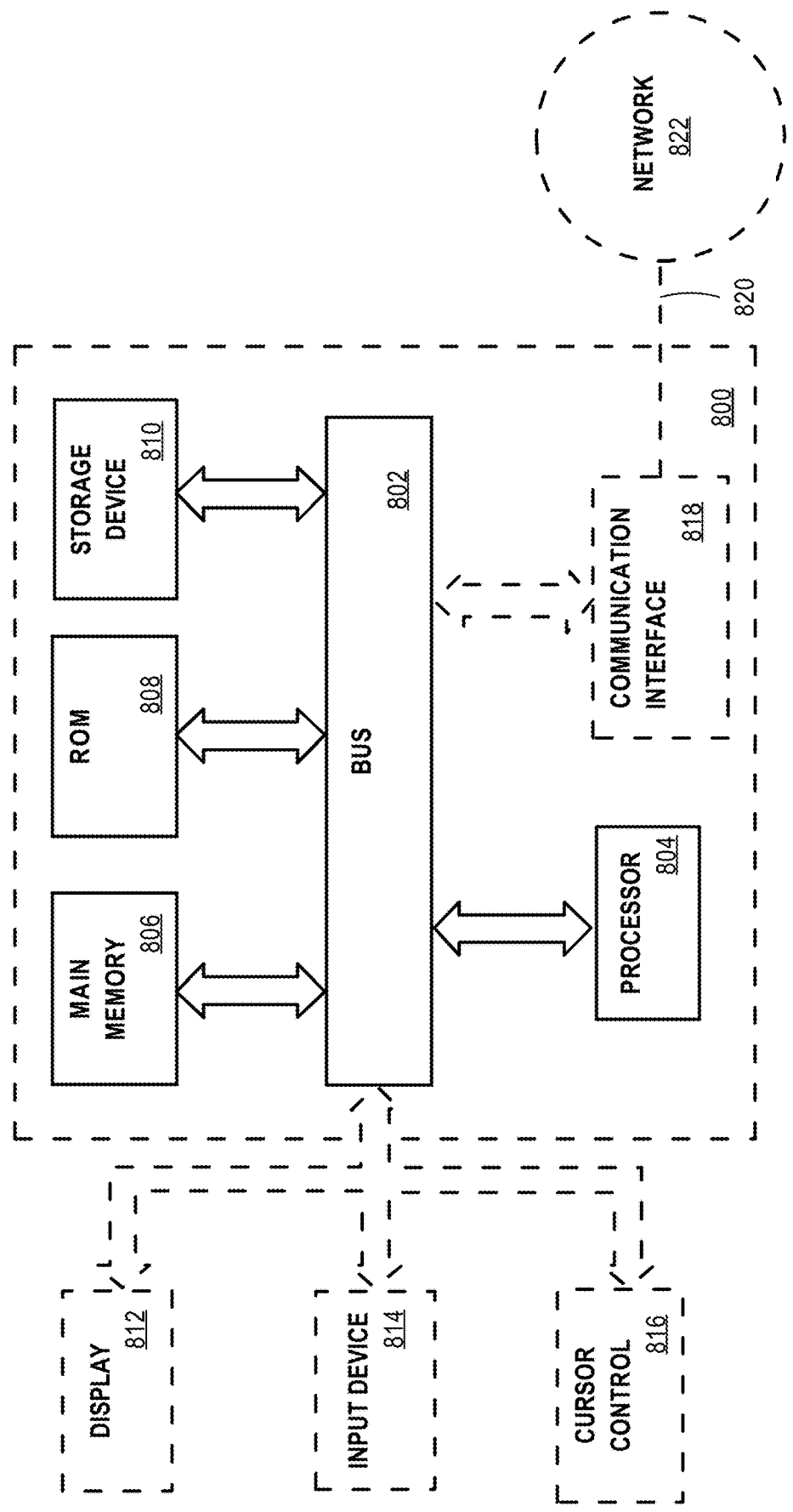
FIG. 8 illustrates an example of a basic hardware machine that may be used utilized to implement the present invention.

The present invention may be implemented using a computing system comprising one or more processors and memory. The one or more processors and memory may be provided by one or more hardware machines. FIG. 8 illustrates an example of a basic hardware machine 800 that may be used to implement the present invention. Hardware machine 800 and its hardware components, including their connections, relationships, and functions, is meant to provide an example only, and not meant to limit implementations of the present invention. Other hardware machines suitable for implementing the present invention may have different components, including components with different connections, relationships, and functions.

Hardware machine 800 includes a bus 802 or other communication mechanism for addressing a main memory 806 and for transferring data between and among the various components of hardware machine 800.

Hardware machine 800 also includes a processor 804 coupled with bus 802 for processing information. Processor 804 may be a general-purpose microprocessor, a system on a chip (SoC), or another hardware processor.

Main memory 806, such as a random-access memory (RAM) or other dynamic storage device, is coupled to bus 802 for storing information and software instructions to be executed by processor 804. Main memory 806 also may be used for storing temporary variables or other intermediate information during execution of software instructions to be executed by processor 804.

Software instructions, when stored in storage media accessible to processor 804, render hardware machine 800 into a special-purpose computing machine that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a machine to perform specific operations, and including, but not limited to, application software, desktop applications, scripts, binaries, operating systems, device drivers, boot loaders, shells, utilities, system software, JAVASCRIPT, web pages, web applications, mobile applications, plugins, embedded software, microcode, compilers, debuggers, interpreters, virtual machines, linkers, and text editors.

Hardware machine 800 includes a read-only memory (ROM) 808 or other static storage device coupled to bus 802 for storing static information and software instructions for a processor 804.

A mass storage device 810 is coupled to bus 802 for persistently storing information and software instructions on fixed or removable media, such as magnetic, optical, solid-state, magnetic-optical, flash memory, or any other available mass storage technology. The mass storage may be shared on a network, or it may be dedicated mass storage. Mass storage device 810 may store a body of program and data for directing operation of hardware machine 800, including an operating system, user application programs, driver, and other support files, as well as other data files of all sorts.

Hardware machine 800 may be coupled via bus 802 to a display 812, such as a liquid crystal display (LCD) or other electronic visual display, for displaying information to a computer user. A touch sensitive surface incorporating touch detection technology (e.g., resistive, capacitive, etc.) may be incorporated with display 812 to form a touch sensitive display for communicating touch gesture (e.g., finger or stylus) input to processor 804.

An input device 814 may be coupled to bus 802 for communicating information and command selections to processor 804. Input device 814 may include alphanumeric and other keys. Input device 814 may include one or more physical buttons or switches such as, for example, a power (on/off) button, a "home" button, volume control buttons, or the like.

A cursor control 816, such as a mouse, a trackball, touchpad, touch-sensitive surface, or cursor direction keys for communicating direction information and command selections to processor 804 and for controlling cursor movement on display 812, may be coupled to bus 802. Cursor control 816 may have two degrees of freedom in two axes, a first axis (e.g., x) and a second axis (e.g., y), that allows the device to specify positions in a plane. Cursor control 816 may have more degrees of freedom with a third axis (e.g., z). For example, cursor control 816 may have three translational degrees of freedom (e.g., surge, heave, and sway) in three perpendicular axes, that allows the device to specify position in the three axes. Cursor control 816 may have three rotational degrees of freedom (e.g., pitch, yaw, roll) about three perpendicular axes, that allows the device to specify an orientation about the three axes.

While one or more of display 812, input device 814, and cursor control 816 may be external components (i.e., peripheral devices) of hardware machine 800, some or all of display 812, input device 814, and cursor control 816 may be integrated as part of the form factor of hardware machine 800.

A function or operation of the present invention may be performed by hardware machine 800 in response to processor 804 executing one or more programs of software instructions contained in main memory 806. Such software instructions may be read into main memory 806 from another storage medium, such as a storage device 810. Execution of the software instructions contained in main memory 806 cause processor 804 to perform the function or operation.

While a function or operation of the present invention may be implemented entirely with software instructions, hard-wired or programmable circuitry of hardware machine 800 (e.g., an ASIC, a FPGA, or the like) may be used in place of or in combination with software instructions to perform the function or operation.

The term "storage media" as used herein refers to any non-transitory media that store data and/or software instructions that cause a hardware machine to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more software instructions to processor 804 for execution. For example, the software instructions may initially be carried on a magnetic disk or solid-state drive of a remote computer. The remote computer can load the software instructions into its dynamic memory and send the software instructions over a data communications network. Hardware machine 800 can receive the data over the data communications network and appropriate circuitry can place the data on bus 802. Bus 802 carries the data to main memory 806, from which processor 804 retrieves and executes the software instructions. The software instructions received by main memory 806 may optionally be stored on storage device 810 either before or after execution by processor 804.

Hardware machine 800 may include a communication interface 818 coupled to bus 802. Communication interface 818 provides a two-way data communication coupling to a wired or wireless network link 820 that connects hardware machine 800 to a data communications network 822 (e.g., a local area network (LAN), a wide area network (WAN), a wireless local area network (WLAN), a metropolitan area network (MAN), a storage area network (SAN), etc.). Network link 820 provides data communication through network 822 to one or more other networked devices.

Communication interface 818 may send and receive electrical, electromagnetic, or optical signals that carry digital data streams representing various types of information. For example, communication interface 818 may be implemented by a wired network interface card, a wireless network interface card with an integrated radio antenna, or a modem.

Network link 820 may provide a connection through network 822 to a host computer or to data equipment operated by an Internet Service Provider (ISP). The ISP may in turn provide data communication services through the world-wide packet data communication network now commonly referred to as the "Internet". Network 822 and Internet use electrical, electromagnetic or optical signals that carry digital data streams. The signals through the various networks and the signals on network link 820 and through communication interface 818, which carry the digital data to and from hardware machine 800, are example forms of transmission media.

Hardware machine 800 can send messages and receive data, including program code, through network 822, network link 820, and communication interface 818. In the Internet example, a server might transmit a requested code for an application program through Internet, ISP, and network 822 and communication interface 818.

The received code may be executed by processor 804 as it is received, and/or stored in storage device 810, or other non-volatile storage for later execution.

Figure 9:
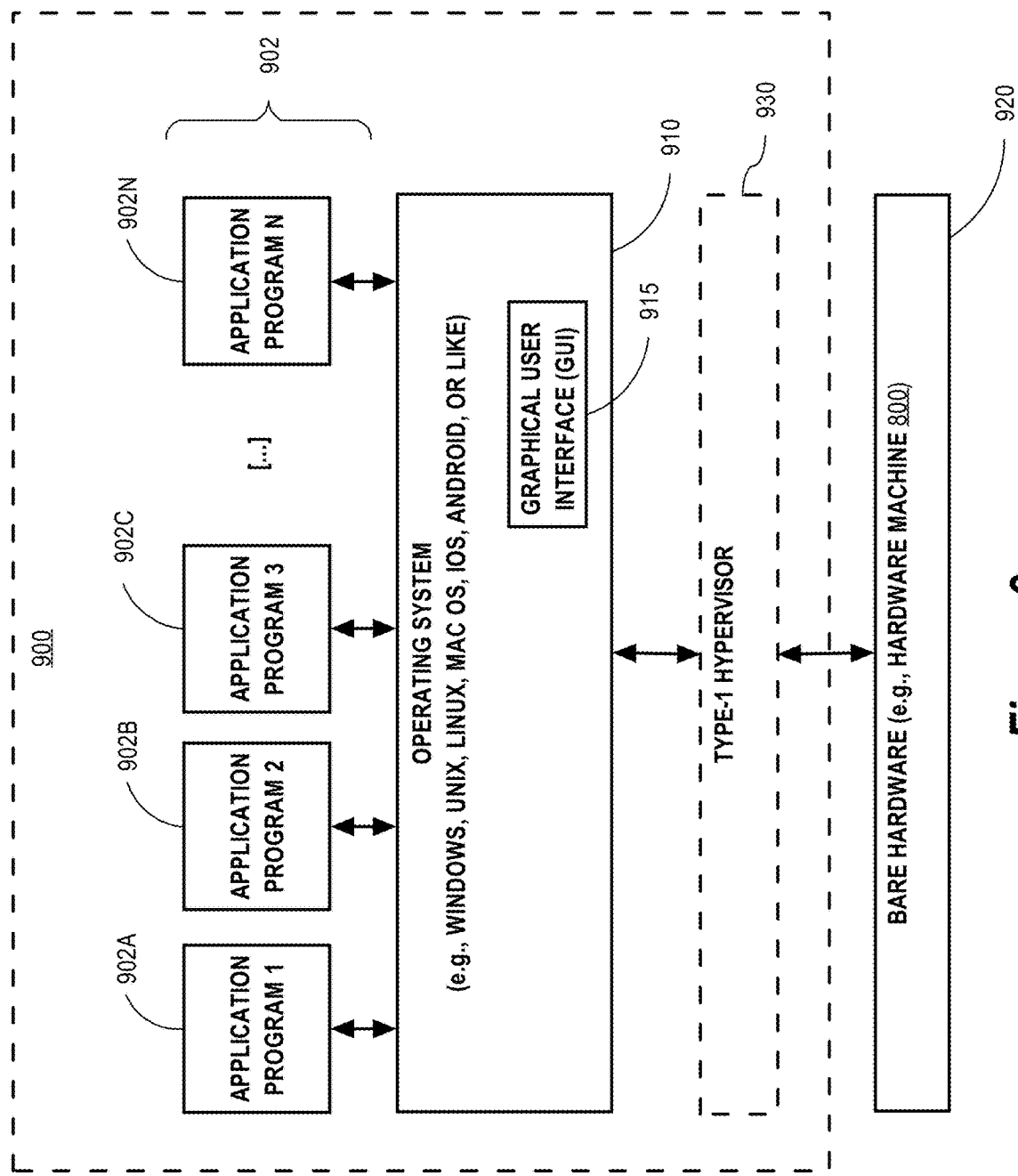
FIG. 9 illustrates an example of a basic software system for controlling the operation of a basic hardware machine.

FIG. 9 illustrates basic software system 900 that may be employed for controlling the operation of hardware machine 800 of FIG. 8. Software system 900 and its software components, including their connections, relationships, and functions, is meant to provide an example only, and not meant to limit implementations of the present invention. Other software systems suitable for implementing the present invention may have different components, including components with different connections, relationships, and functions.

Software system 900 is provided for directing the operation of hardware machine 800. Software system 900 may be stored in system memory (RAM) 806 and on fixed storage (e.g., hard disk or flash memory) 810.

Software system 900 includes a kernel or operating system (OS) 910. OS 910 manages low-level aspects of computer operation, including managing execution of processes, memory allocation, file input and output (I/O), and device I/O.

Software system 900 includes one or more application programs, represented as 902A, 902B, 902C . . . 902N, that may be "loaded" (e.g., transferred from fixed storage 810 into memory 806) for execution by hardware machine 800. The applications or other software intended for use on hardware machine 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. GUI 915 also serves to display the results of operation from the OS 910 and applications 902, whereupon the user may supply additional inputs or terminate the session (e.g., log off).

Software system 900 can execute directly on bare hardware 920 (e.g., machine 800). Alternatively, a "Type-1" hypervisor 930 may be interposed between the bare hardware 920 and OS 910 as part of software system 900. Hypervisor 930 acts as a software "cushion" or virtualization layer between the OS 910 and bare hardware 920. Hypervisor 930 instantiates and runs one or more virtual machine instances. Each virtual machine instance comprises a "guest" operating system, such as OS 910, and one or more applications, such as applications 902, designed to execute on the guest operating system. Hypervisor 930 presents the guest operating systems with a virtual operating platform and manages the execution of the guest operating systems.

Hypervisor 930 may allow a guest operating system to run as if it is running on bare hardware 920 directly. In this case, the guest operating system as configured to execute on bare hardware 920 can also execute on hypervisor 930. In other words, hypervisor 930 may provide full hardware virtualization to the guest operating system. Alternatively, hypervisor 930 may provide para-virtualization to the guest operating system. In this case, the guest operating system is "aware" that it executes on hypervisor 930 and is specially designed or configured to execute on hypervisor 930.

EXTENSIONS AND ALTERNATIVES

In the foregoing description, for the purposes of explanation, numerous specific details are set forth in order to provide a thorough understanding of the present invention.

It will be apparent, however, that the present invention may be practiced without these specific details. In other instances, well-known structures and devices are shown in block diagram form to avoid unnecessarily obscuring the present invention.

In the foregoing specification, the present invention has been described regarding numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
  receiving from each database server of a plurality of known database servers in a distributed data storage system, an identifier of a first source version of an application schema;
  determining, based at least in part on the receiving, that each database server of the plurality of known database servers is currently using the first source version of the application schema;
  based at least in part on the determining that each database server of the plurality of known database servers is currently using the first source version of the application schema, sending a first intermediate version of a second source version of the application schema to each of the plurality of known database servers in the distributed data storage system;
  wherein the first intermediate version of the second source version of the application schema marks a particular schema element as delete-only;
  based at least in part on determining that each database server of the plurality of known database servers is currently using the first intermediate version of the second source version of the application schema, sending a second intermediate version of the second source version of the application schema to each of the plurality of known database servers;
  wherein the second intermediate version of the second source version of the application schema marks the particular schema element as write-only;
  wherein the method is performed by a computing system having one or more processors and storage media to coordinate an application schema change in the distributed data storage system so as to prevent introducing a data inconsistency in the distributed data storage system; and
  wherein the application schema change comprises adding the particular schema element to the application schema.

2. The method of claim 1, further comprising:
  sending a remote procedure call to each database server of the plurality of known database servers, including periodically resending the remote procedure call to each database server as necessary, until each database server of the plurality of known database servers responds indicating that the first source version of the application schema is currently being used by the database server.

3. The method of claim 1, further comprising:
  based, at least in part, on the determining that each database server of the plurality of known database servers is currently using the first source version of the application schema, sending a remote procedure call to each database server of the plurality of known database servers, including periodically resending the remote procedure call to each database server as necessary, until each database server of the plurality of known database servers responds indicating that the database server is no longer serving requests to perform data operations according to a version of the application schema prior to the first source version of the application schema.

4. The method of claim 1, wherein the particular schema element is absent in the first source version of the application schema.

5. The method of claim 1, wherein the particular schema element is a secondary index.

6. The method of claim 1, wherein the particular schema element is a secondary index; and wherein the method further comprises backfilling the secondary index at each database server of the plurality of known database servers.

7. A computing system comprising:
  one or more processors;
  storage media; and
  one or more programs stored in the storage media and comprising instructions which, when executed by the computing system, cause the computing system to perform operations for coordinating an application schema change in a distributed data storage system to prevent introducing a data inconsistency in the distributed data storage system, the application schema change comprising removing a particular schema element from an application schema, the operations comprising:
  based on sending a first remote procedure call to each database server of a plurality of known database servers, receiving, from each database server of the plurality of known database servers, a schema version identifier identifying a version of the application schema currently in use at the database server;
  determining, based at least in part on the receiving, that one or more database servers of the plurality of known database servers are currently using a first intermediate version of a first source version of the application schema;
  determining, based at least in part on the receiving, that one or more other database servers of the plurality of known database servers are currently using a second intermediate version of the first source version of the application schema;
  sending the second intermediate version of the application schema to each of the one or more database servers currently using the first intermediate version of the application schema;
  determining that each database server of the plurality of known database servers are currently using the second intermediate version of the application schema;
  based at least in part on the determining that all the plurality of known database servers are currently using the second intermediate version of the application schema, sending a first source version of the application schema to each database server of the plurality of known database servers;
  wherein the particular schema element is marked as write-only in the first intermediate version of the first source version of the application schema; and
  wherein the particular schema element is marked as delete-only in the second intermediate version of the first source version of the application schema.

8. The computing system of claim 7, wherein the particular schema element is absent from the first source version of the application schema.

9. One or more non-transitory computer-readable media comprising:
one or more programs for execution by a computing system having one or more processors, the one or more programs comprising instructions which, when executed by the computing system, cause the computing system to perform operations for coordinating an application schema change in a distributed data storage system to prevent introducing a data inconsistency in the distributed data storage system, the application schema change comprising removing a particular schema element from an application schema, the operations comprising:
receiving from each database server of a plurality of known database servers in the distributed data storage system, an identifier of a first source version of the application schema;
determining, based at least in part on the receiving, that each database server of the plurality of known database servers is currently using the first source version of the application schema;
based at least in part on the determining that each database server of the plurality of known database servers is currently using the first source version of the application schema, sending a first intermediate version of a second source version of the application schema to each of the plurality of known database servers in the distributed data storage system;
wherein the first intermediate version of the second source version of the application schema marks the particular schema element as write-only;
based at least in part on determining that each database server of the plurality of known database servers is currently using the first intermediate version of the second source version of the application schema, sending a second intermediate version of the second source version of the application schema to each of the plurality of known database servers; and
wherein the second intermediate version of the second source version of the application schema marks the particular schema element as delete-only.

10. The one or more non-transitory computer-readable media of claim 9, wherein the particular schema element is an entity type or an association type.

11. The one or more non-transitory computer-readable media of claim 9, wherein the particular schema element is marked as public in the first source version of the application schema.

12. The one or more non-transitory computer-readable media of claim 9, wherein the particular schema element is a secondary index.

13. The one or more non-transitory computer-readable media of claim 9, the one or more programs further comprising instructions which, when executed by the computing system, cause the computing system to perform:
based at least in part on determining that each database server of the plurality of known database servers is currently using the second intermediate version of the second source version of the application schema, sending the second source version of the application schema to each database server of the plurality of known database servers; and
wherein the particular schema element is absent from the second source version of the application schema.

* * * * *